Figure 3:
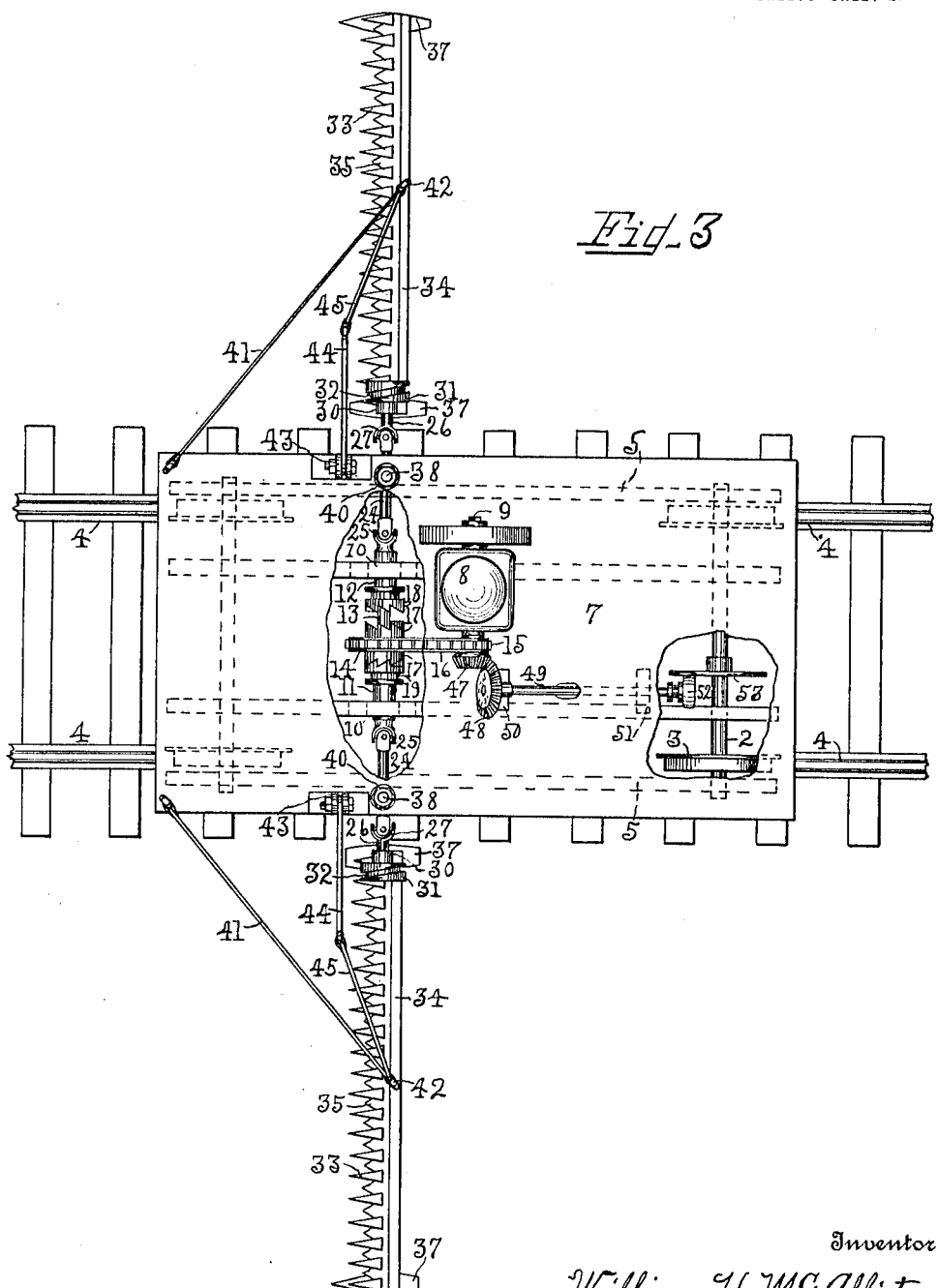

W. H. McALLISTER.
RAILWAY RIGHT OF WAY MOWING DEVICE.
APPLICATION FILED OCT. 16, 1918.
1,311,825.
Patented July 29, 1919.
2 SHEETS—SHEET 1.
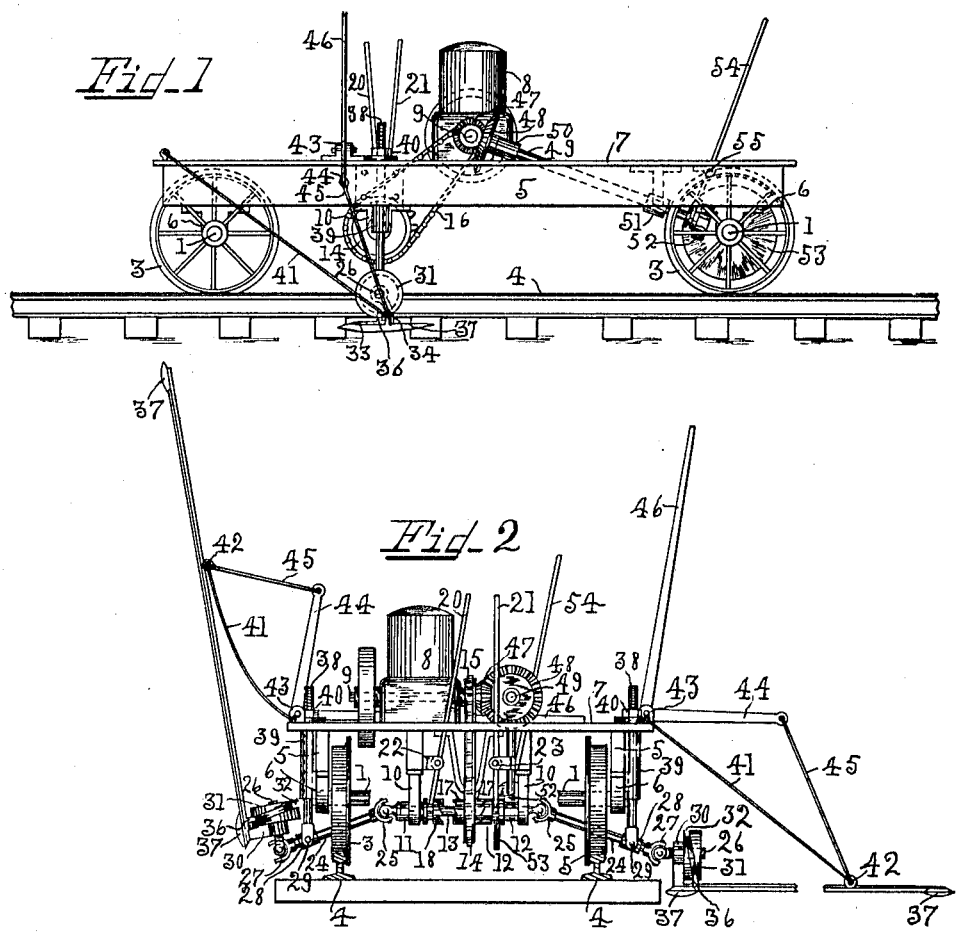
Inventor.
William H. McAllister.
By J. P. Dederick.
Attorney.

W. H. McALLISTER.
RAILWAY RIGHT OF WAY MOWING DEVICE.
APPLICATION FILED OCT. 16, 1918.

1,311,825.

Patented July 29, 1919.
2 SHEETS—SHEET 2.

Inventor.
William H. McAllister.

By J. P. Dederick.
Attorney.

UNITED STATES PATENT OFFICE.

WILLIAM H. McALLISTER, OF GAINESVILLE, TEXAS.

RAILWAY RIGHT-OF-WAY-MOWING DEVICE.

1,311,825.  Specification of Letters Patent.  Patented July 29, 1919.

Application filed October 16, 1918. Serial No. 258,344.

*To all whom it may concern:*

Be it known that I, WILLIAM H. McALLISTER, a citizen of the United States, residing at Gainesville, in the county of Cooke and State of Texas, have invented certain new and useful Improvements in Railway Right-of-Way-Mowing Devices, of which the following is a specification.

This invention relates to improvements in mowing devices and more particularly to the type employed for removing weeds and grass from railways.

An object of this invention is the provision of a mower provided with means for removing weeds and grass from the ground lying beyond the opposite ends of the cross ties and prevent the same from encroaching upon the ballast and the ties of a railway track.

Another object is the provision of a wheeled support provided with a mower blade on either side thereof and a motor for operating the blades and propelling the support, and also whereby the support may be propelled and the blades rendered inoperative.

Further objects of the invention are to arrange a pair of mower blades on elements so as to secure maximum efficiency in the operation of cutting the weeds and at the same time make said mowing blades yieldingly adjustable in perpendicular planes so that they will operate at different depths and in various positions, to provide means operatively connected with the mowing blades for easily and quickly throwing them out of working position, and to provide for ready disconnection of either of said blades, so that they may be used individually or employed collectively, as may be desired.

With these and other objects in view, which will more fully hereinafter appear, the invention consists in certain novel details of construction and arrangement of parts, hereinafter fully described, illustrated in the accompanying drawings and more particularly pointed out in the appended claims; it being understood that various changes in the form, proportion, size, and minor details of the device may be made, within the scope of the appended claims, without sacrificing any of the advantages of the invention.

In the accompanying drawings, forming a part of this specification; Figure 1 is a side elevation of the device, Fig. 2 is a front end view, and Fig. 3 is a plan view of Fig. 1.

The device forming part of the subject matter of my invention comprises a wheeled car or carriage including in its construction a pair of spaced axles 1 and 2, to the opposite ends of which are secured flanged wheels 3 to bear upon the rails 4. The wheels and their axles support a body which includes a pair of sides 5 provided with boxes 6 to receive the axles, the sides being connected by means of a platform 7.

Positioned on the platform 7 and to one side of the central line thereof is located a gas engine designated by the numeral 8, the main shaft of this motor extending toward the longitudinal center line of the platform and designated by the numeral 9. Depending from the lower sides of the platform 7 and on opposite sides of the longitudinal central line thereof are hangers 10, the lower ends of which are provided with boxings in which are journaled laterally slidable sleeves 11 and 12 in which sleeves are journaled the opposite end portions of a shaft 13. Keyed to the middle portion of the shaft 13 is a sprocket wheel 14, and keyed near the end portion of the engine shaft 9 is a sprocket pinion 15 in alinement with the sprocket 14, connection between said sprockets being established by means of a sprocket chain 16.

Integrally formed with the sprocket 14 and upon each side thereof are clutch members 17, and upon the inwardly extending ends of the sleeves 11 and 12 are clutch collars 18 and 19 adapted for engagement therewith. The usual annular grooves are formed in the collars, and shift levers 20 and 21 having the usual shifting forks, and fulcrumed at 22 and 23 are provided for shifting the collars into or out of engagement with the clutch members. Laterally extending and downwardly inclined shafts 24 are connected with the sleeves 11 and 12 by universal couplings 25, and the opposite ends of the shafts are connected with shafts 26 by similar couplings 27, the former shafts being journaled near their outer ends in collars 28 provided with pins or trunnions 29 at opposite points, and the latter shafts carried in bearings 30. To the outer end of each of the shafts 26 is secured a cam wheel 31, peripherally grooved as shown by 32.

Laterally extending from the sides of the car are mower blades comprising finger bars 34, and on the said finger bars sickle bars 35 are mounted to slide, all of which may be of ordinary construction. An upstanding pin 36 is formed upon the inner end of both sickle bars and engage the grooves 32 respectively of the cam wheels, thus imparting to the sickle bars the desired reciprocating movement when the cam wheels are revolved. To both ends of the mowing blades are secured the usual shoes 37, the inner ones carrying the bearings 30, and the bearing collars 28 have upwardly extended stem supports 38 passing loosely through sleeves 39 that are secured to the sides of the car. The blades are adjusted to the extreme downward movement desired by nuts 40 on the threaded ends of the stems 38, but the free movement of the stems through the sleeves 39 yieldingly hold them in engagement with the ground when in operation. The blades are braced by rods 41 secured to eyes 42 in the cross bars 34 and to the front end of the car platform 7. In passing over cattle guards and occasionally over other obstructions that may be encountered it would be necessary to raise the mower blades to nearly a vertical position,—one being shown so elevated in Fig. 2, and for this purpose a pair of bell crank levers are provided and pivoted in bearings 43, positioned to the opposite sides of the car platform. The arms 44 of the levers when in operative position, extend outwardly from the platform and overlie the medial portions of the mower blades and are connected thereto at 42, by rods 45, while the opposite levers 46 of the bell cranks would extend substantially vertically upward, these positions being reversed when passing obstructions as above mentioned.

At the end of the engine shaft 9 is secured a bevel pinion 47, in engagement with a bevel wheel 48 carried by a downwardly inclined shaft 49 that is suitably journaled in bearings 50 and 51. Along the lower end of this shaft is slidably splined a friction pinion 52 that contacts the face of a friction disk 53 keyed to the car axle 2. An upstanding shift lever 54, fulcrumed at 55 is forked at the lower end to engage an annular groove in the hub of the pinion 52, and when the engine is running at the proper speed for operating the sickle bars, moving said pinion to or from the center of the disk, imparts the desired speed to the car.

Before this device can be used to advantage on a large part of the railway systems of the country, the surface on both sides of the track will require clearing of obstructions and smoothing; this is urgently needed whether or not my device is used, as it would improve the drainage of the tracks, and add greatly to the appearance of the right of way.

Having now set forth the object and nature of my invention and a form of apparatus embodying the same, and having described the construction, function, and mode of operation thereof, what I claim as new and desire to secure by Letters Patent, is—

1. In a device of the class described the combination with a wheeled support, a motor arranged on said support, and a shaft driven by said motor; of mower blades positioned beyond both sides of the support, shaft sections having their opposite ends universally connected to one end of each of the mower blades and the first named shaft, and means for yieldingly holding the said blades in engagement with the ground.

2. A machine of the class described comprising a wheeled support, a mower blade pivotally connected to each of the opposite sides of the support and positioned to operate on the surface beyond the opposite ends of the cross ties of the track, means for moving the blades upwardly from engagement with the ground, also in planes at right angles to the plane of the said blades when in operative position, and a motor carried by the support for simultaneously vibrating the sickle bars and propelling the support.

In testimony whereof I affix my signature.

WILLIAM H. McALLISTER.

Witness:
R. M. MUTT.